US011834971B2

United States Patent
Kawamura et al.

(10) Patent No.: US 11,834,971 B2
(45) Date of Patent: Dec. 5, 2023

(54) HYDRAULIC OIL CONTROL VALVE AND VALVE TIMING ADJUSTING DEVICE

(71) Applicant: DENSO CORPORATION, Kariya (JP)

(72) Inventors: Futoshi Kawamura, Kariya (JP); Kinya Takahashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 176 days.

(21) Appl. No.: 17/483,649

(22) Filed: Sep. 23, 2021

(65) Prior Publication Data

US 2022/0010699 A1 Jan. 13, 2022

Related U.S. Application Data

(63) Continuation of application No. PCT/JP2020/010010, filed on Mar. 9, 2020.

(30) Foreign Application Priority Data

Mar. 25, 2019 (JP) .................. 2019-055926

(51) Int. Cl.
*F01L 1/344* (2006.01)
*F16K 11/07* (2006.01)
*F16K 27/04* (2006.01)

(52) U.S. Cl.
CPC ............ *F01L 1/3442* (2013.01); *F16K 11/07* (2013.01); *F16K 27/041* (2013.01); *F01L 2001/34426* (2013.01)

(58) Field of Classification Search
CPC . F01L 1/022; F01L 1/047; F01L 1/053; F01L 1/3442; F01L 2001/134426; F01L 2001/3443; F01L 1/34456; F01L 1/34479; F16K 11/07; F16K 11/0716; F16K 27/041
See application file for complete search history.

(56) References Cited

U.S. PATENT DOCUMENTS

| 2018/0003090 A1 | 1/2018 | Koehler et al. |
| 2019/0323388 A1 | 10/2019 | Mitsutani |
| 2019/0323392 A1 | 10/2019 | Mitsutani |
| 2019/0368387 A1 | 12/2019 | Mitsutani |

FOREIGN PATENT DOCUMENTS

| DE | 10 2013 209 865 | 12/2014 | |
| JP | 2013-100768 | 5/2013 | |
| JP | 2013100768 A * | 5/2013 | ............ F01L 1/356 |
| JP | 2018059415 A | 4/2018 | |
| JP | 2020-159203 | 10/2020 | |
| JP | 2020-159204 | 10/2020 | |
| WO | WO-2018135586 A1 * | 7/2018 | ............ F01L 1/344 |
| WO | 2020/196403 | 10/2020 | |

(Continued)

*Primary Examiner* — Loren C Edwards
(74) *Attorney, Agent, or Firm* — Nixon & Vanderhye P.C.

(57) ABSTRACT

A hydraulic oil control valve, which is placed along a rotational axis of a valve timing adjusting device, includes a sleeve and a spool configured to slide in an axial direction on an inner side of the sleeve in a radial direction. The sleeve includes: an inner sleeve that has an opening in which a distal end portion of the spool is inserted; and an outer sleeve. In a state where the spool is positioned farthest from an actuator, the distal end portion projects from the opening toward a side that is opposite to the actuator.

9 Claims, 6 Drawing Sheets

(56) References Cited

FOREIGN PATENT DOCUMENTS

| WO | 2020/196404 | 10/2020 |
| WO | 2020/196418 | 10/2020 |
| WO | 2020/196454 | 10/2020 |
| WO | 2020/196456 | 10/2020 |
| WO | 2020/196457 | 10/2020 |

\* cited by examiner

HYDRAULIC OIL CONTROL VALVE AND VALVE TIMING ADJUSTING DEVICE

CROSS REFERENCE TO RELATED APPLICATIONS

This application is a continuation application of International Patent Application No. PCT/JP2020/010010 filed on Mar. 9, 2020, which designated the U.S. and claims the benefit of priority from Japanese Patent Application No. 2019-055926 filed on Mar. 25, 2019. The entire disclosures of all of the above applications are incorporated herein by reference.

TECHNICAL FIELD

The present disclosure relates to a hydraulic oil control valve used in a valve timing adjusting device.

BACKGROUND

Previously, there is known a hydraulic valve timing adjusting device that can adjust a valve timing of intake valves or exhaust valves of an internal combustion engine. In the hydraulic valve timing adjusting device, supply of hydraulic oil to and discharge of the hydraulic oil from each hydraulic chamber formed by a vane rotor in an inside of a housing may be realized by a hydraulic oil control valve installed at the center of the vane rotor. One such a hydraulic oil control valve has a double-structured tubular sleeve, which includes an outer sleeve and an inner sleeve. The outer sleeve is fixed to an end portion of a camshaft, and a spool slides at the inside of the inner sleeve to switch an oil passage. A stopper, which limits a movable range of the spool, is placed in the inner sleeve of the hydraulic oil control valve at a location where the stopper is opposed to a distal end portion of the spool.

SUMMARY

This section provides a general summary of the disclosure, and is not a comprehensive disclosure of its full scope or all of its features.

According to one aspect of the present disclosure, there is provided a hydraulic oil control valve. The hydraulic oil control valve is configured to control flow of hydraulic oil supplied from a hydraulic oil supply source and to be placed along a rotational axis of a valve timing adjusting device. The valve timing adjusting device is fixed to an end portion of one of a drive shaft and a driven shaft to adjust a valve timing of a valve, and the driven shaft receives a drive force from the drive shaft to open and close the valve.

The hydraulic oil control valve includes a sleeve and a spool while the spool is placed on an inner side of the sleeve in a radial direction. The sleeve includes an inner sleeve and an outer sleeve. The inner sleeve is placed on an outer side of the spool in the radial direction and has an opening formed at an end portion of the inner sleeve which is opposite to an actuator for driving the spool in the axial direction. A distal end portion of the spool is inserted in the opening of the inner sleeve. The outer sleeve has an axial hole which extends in the axial direction. The inner sleeve is inserted in at least a portion of the axial hole. In a state where the spool is positioned farthest from the actuator, the distal end portion projects from the opening toward a side that is opposite to the actuator.

BRIEF DESCRIPTION OF DRAWINGS

The drawings described herein are for illustrative purposes only of selected embodiments and not all possible implementations, and are not intended to limit the scope of the present disclosure.

DETAILED DESCRIPTION

Figure 1:
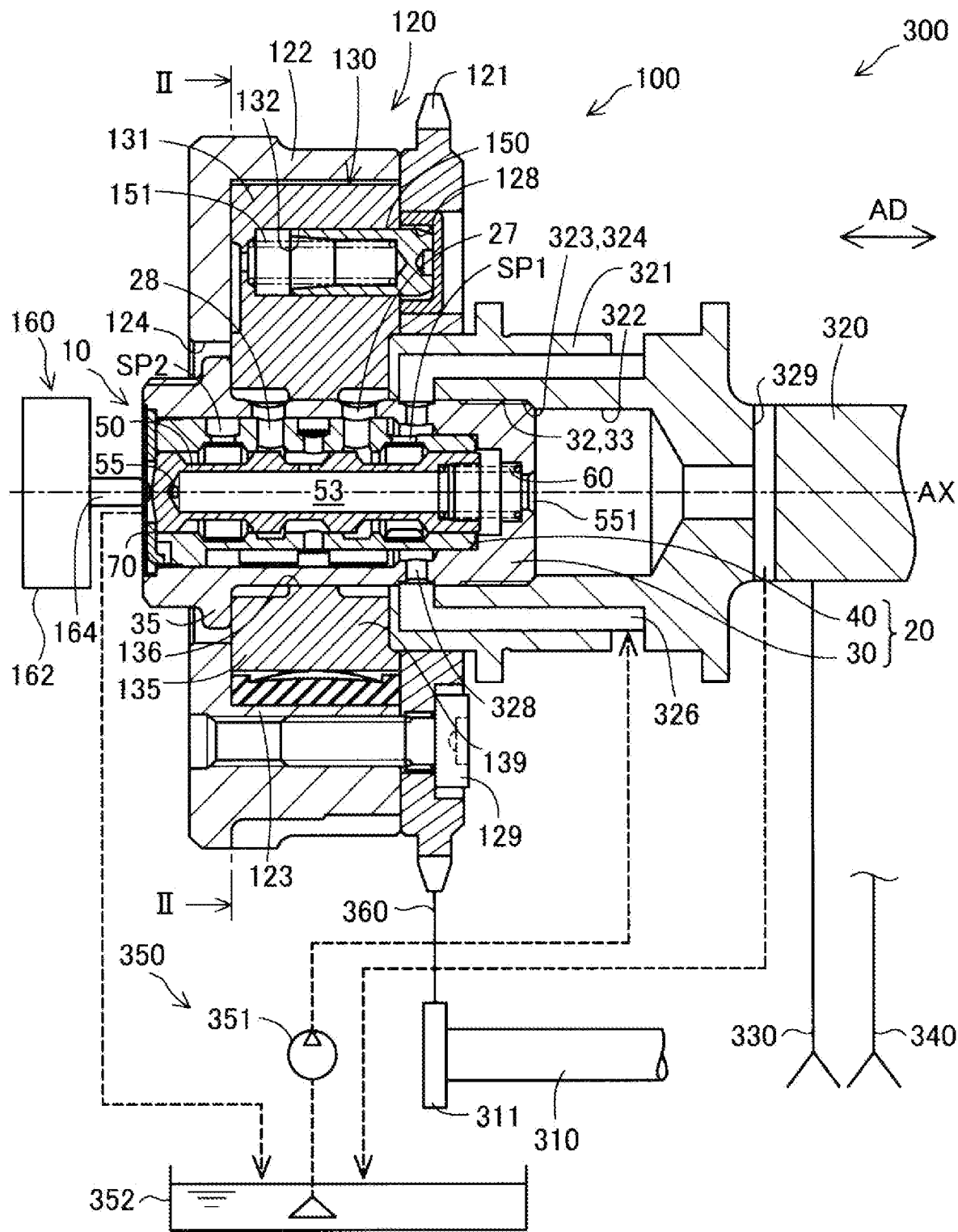
FIG. 1 is a cross-sectional view showing a schematic configuration of a valve timing adjusting device including a hydraulic oil control valve according to a first embodiment.

Previously, there is known a hydraulic valve timing adjusting device that can adjust a valve timing of intake valves or exhaust valves of an internal combustion engine. In the hydraulic valve timing adjusting device, supply of the hydraulic oil to and discharge of the hydraulic oil from each hydraulic chamber formed by a vane rotor in an inside of a housing may be realized by a hydraulic oil control valve installed at the center of the vane rotor. One such a hydraulic oil control valve has a double-structured tubular sleeve, which includes an outer sleeve and an inner sleeve. The outer sleeve is fixed to an end portion of a camshaft, and a spool slides at the inside of the inner sleeve to switch an oil passage. A stopper, which limits a movable range of the spool, is placed in the inner sleeve of the hydraulic oil control valve at a location where the stopper is opposed to a distal end portion of the spool.

Mountability of the above-described hydraulic oil control valve may possibly be deteriorated since a size of the inner sleeve measured in the axial direction may possibly be increased due to the presence of the stopper in the inner sleeve. Therefore, a technology, which can limit the increase in the size of the inner sleeve measured in the axial direction, is desired.

The present disclosure can be implemented as follows.

According to one aspect of the present disclosure, there is provided a hydraulic oil control valve. The hydraulic oil control valve is configured to control flow of hydraulic oil supplied from a hydraulic oil supply source and to be placed along a rotational axis of a valve timing adjusting device. The valve timing adjusting device is fixed to an end portion of one of a drive shaft and a driven shaft to adjust a valve timing of a valve, and the driven shaft receives a drive force from the drive shaft to open and close the valve.

The hydraulic oil control valve includes:
a sleeve that is shaped in a tubular form; and
a spool that is configured to be driven by an actuator such that the spool slides in an axial direction at a location that is on an inner side of the sleeve in a radial direction while the actuator contacts one end of the spool, wherein:

the sleeve includes:
- an inner sleeve that is placed on an outer side of the spool in the radial direction and has an opening formed at an end portion of the inner sleeve which is opposite to the actuator in the axial direction, wherein a distal end portion of the spool is inserted in the opening of the inner sleeve; and
- an outer sleeve that has an axial hole which extends in the axial direction, wherein the inner sleeve is inserted in at least a portion of the axial hole; and in a state where the spool is positioned farthest from the actuator, the distal end portion projects from the opening toward a side that is opposite to the actuator.

According to the hydraulic oil control valve of this aspect, in the state where the spool is positioned farthest from the actuator, the distal end portion of the spool projects from the opening of the inner sleeve toward the side that is opposite to the actuator. Therefore, a location of the end portion of the inner sleeve can be closer to the actuator in comparison to the configuration, in which the stopper for limiting the movable range of the spool is placed in the inner sleeve at the location where the stopper is opposed to the distal end portion of the spool. Thus, the length of the inner sleeve measured in the axial direction can be reduced. Thereby, the increase in the size of the inner sleeve in the axial direction can be limited.

The present disclosure can be implemented in various forms. For example, the present disclosure may be implemented as a manufacturing method of the hydraulic oil control valve, a valve timing adjusting device including the hydraulic oil control valve and a manufacturing method of the valve timing adjusting device.

Hereinafter, embodiments of the present disclosure will be described with reference to the drawings.

A. First Embodiment

A-1. Device Configuration:

A valve timing adjusting device 100 of FIG. 1 is configured to adjust a valve timing of valves that are driven to open and close by a camshaft 320 which receives a drive force transmitted from a crankshaft 310 at an internal combustion engine 300 of a vehicle (not shown). The valve timing adjusting device 100 is installed in a drive force transmission path that extends from the crankshaft 310 to the camshaft 320. More specifically, the valve timing adjusting device 100 is fixed to an end portion 321 of the camshaft 320 in a direction (hereinafter referred to as an axial direction AD) along a rotational axis AX of the camshaft 320. The rotational axis AX of the valve timing adjusting device 100 coincides with the rotational axis AX of the camshaft 320. Among intake valves 330 and exhaust valves 340, which serve as valves, the valve timing adjusting device 100 of the present embodiment adjusts the valve timing of the intake valves 330.

An axial hole 322, a plurality of supply holes 326 and a plurality of discharge holes 329 are formed at the end portion 321 of the camshaft 320. The axial hole 322 extends in the axial direction AD. An axial fixing portion 323, which is configured to fix a hydraulic oil control valve 10 described later, is formed at an inner peripheral surface of the axial hole 322. A female-threaded portion 324 is formed at the axial fixing portion 323. The female-threaded portion 324 is threadably engaged with a male-threaded portion 33 formed at a fixing portion 32 of the hydraulic oil control valve 10. The supply holes 326 communicate between an outer peripheral surface of the camshaft 320 and the supply holes 328. The hydraulic oil is supplied from a hydraulic oil supply source 350 to the supply holes 326. The discharge holes 329 extend in the radial direction and communicate between the outer peripheral surface of the camshaft 320 and the axial hole 322. The hydraulic oil, which is discharged from the valve timing adjusting device 100, is discharged to the outside through the discharge holes 329. The hydraulic oil supply source 350 includes an oil pump 351 and an oil pan 352. The oil pump 351 pumps up the hydraulic oil stored in the oil pan 352.

Figure 2:
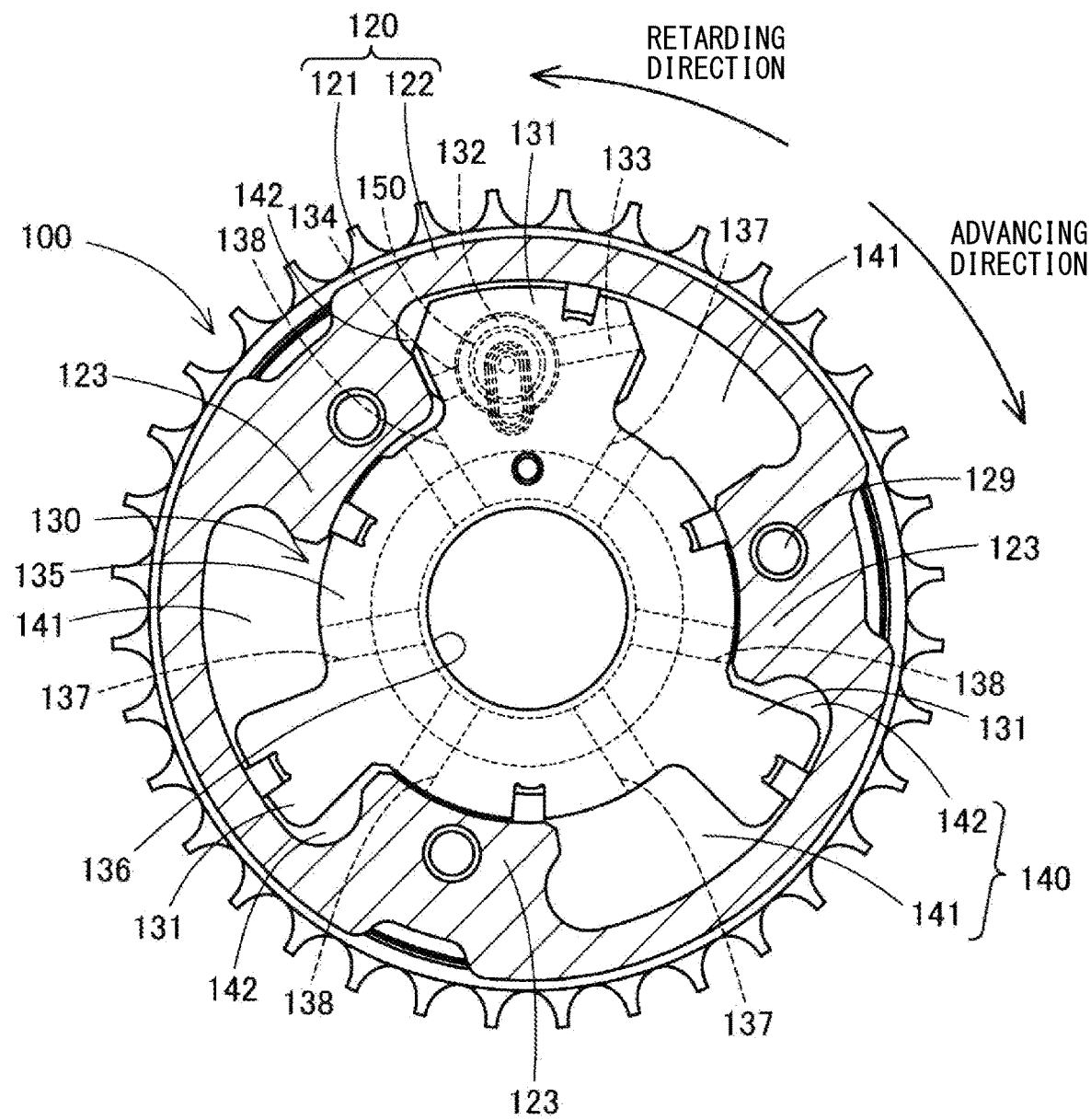
FIG. 2 is a cross-sectional view taken along line II-II in FIG. 1.

As shown in FIGS. 1 and 2, the valve timing adjusting device 100 includes a housing 120, a vane rotor 130 and the hydraulic oil control valve 10. In FIG. 2, indication of the hydraulic oil control valve 10 is omitted.

As shown in FIG. 1, the housing 120 includes a sprocket 121 and a case 122. The sprocket 121 is fitted to and is rotatably supported by the end portion 321 of the camshaft 320. A fitting recess 128 is formed at the sprocket 121 at a location that corresponds to a lock pin 150 described later. A timing chain 360, which is shaped in a loop form, is wound around the sprocket 121 and a sprocket 311 of the crankshaft 310. The sprocket 121 is fixed to the case 122 with a plurality of bolts 129. Therefore, the housing 120 is rotated synchronously with the crankshaft 310. The case 122 is shaped in a bottomed tubular form, and an opening end of the case 122 is closed by the sprocket 121. As shown in FIG. 2, a plurality of partition walls 123 radially inwardly projects at the case 122 while the partition walls 123 are arranged one after another in a circumferential direction. A space between each adjacent two of the partition walls 123, which are adjacent to each other in the circumferential direction, functions as a hydraulic chamber 140. As shown in FIG. 1, an opening 124 is formed at a center of a bottom of the case 122.

The vane rotor 130 is received in an inside of the housing 120 and is rotated in a retarding direction or an advancing direction relative to the housing 120 according to a hydraulic pressure of the hydraulic oil supplied from the hydraulic oil control valve 10. Therefore, the vane rotor 130 serves as a phase shifter that is configured to shift a phase of the driven shaft relative to the drive shaft. The vane rotor 130 includes a plurality of vanes 131 and a boss 135.

As shown in FIG. 2, the vanes 131 radially outwardly project from the boss 135 placed at the center of the vane rotor 130 and are arranged one after another in the circumferential direction. Each of the vanes 131 is received in a corresponding one of the hydraulic chambers 140 and partitions the corresponding hydraulic chamber 140 into a retard chamber 141 and an advance chamber 142 in the circumferential direction. The retard chamber 141 is located on one side of the vane 131 in the circumferential direction. The advance chamber 142 is located on the other side of the vane 131 in the circumferential direction. A receiving hole 132 extends in the axial direction at one of the vanes 131. The receiving hole 132 is communicated with the adjacent retard chamber 141 through a retard-chamber-side pin control oil passage 133 formed at the vane 131 and is communicated with the adjacent advance chamber 142 through an advance-chamber-side pin control oil passage 134 formed in the vane 131. The lock pin 150, which is configured to reciprocate in the axial direction AD, is placed in the receiving hole 132. The lock pin 150 limits rotation of the vane rotor 130 relative to the housing 120 and limits collision between the housing 120 and the vane rotor 130 in the circumferential direction in a state where the hydraulic pressure is insufficient. The lock pin 150 is urged by a spring 151 in the axial direction AD toward the fitting recess 128 that is formed at the sprocket 121.

The boss 135 is shaped in a tubular form and is fixed to the end portion 321 of the camshaft 320. Therefore, the vane rotor 130, which includes the boss 135, is fixed to the end portion 321 of the camshaft 320 and is rotated integrally with the camshaft 320. A through-hole 136 extends through the center of the boss 135 in the axial direction AD. The hydraulic oil control valve 10 is installed in the through-hole 136. A plurality of retard oil passages 137 and a plurality of advance oil passages 138 extend through the boss 135 in the radial direction. Each of the retard oil passages 137 and a corresponding one of the advance oil passages 138 are arranged side-by-side in the axial direction AD. Each retard oil passage 137 communicates between a corresponding retard port 27 of the hydraulic oil control valve 10 described later and the corresponding retard chamber 141. Each advance oil passage 138 communicates between a corresponding advance port 28 of the hydraulic oil control valve 10 described later and the corresponding advance chamber 142. An outer sleeve 30 of the hydraulic oil control valve 10 described later seals between each retard oil passage 137 and each advance oil passages 138 in the through-hole 136.

In the present embodiment, the housing 120 and the vane rotor 130 are made of an aluminum alloy. However, the housing 120 and the vane rotor 130 may be made of any metal material (e.g., iron or stainless steel) or any resin material besides the aluminum alloy.

As shown in FIG. 1, the hydraulic oil control valve 10 is placed along the rotational axis AX of the valve timing adjusting device 100 and is configured to control flow of the hydraulic oil supplied from the hydraulic oil supply source 350. The operation of the hydraulic oil control valve 10 is controlled by instructions from an ECU (not shown) that controls an overall operation of the internal combustion engine 300.

The hydraulic oil control valve 10 is driven by a solenoid device 160 located on the opposite side that is opposite to the camshaft 320 in the axial direction AD. The solenoid device 160 includes an electromagnetic arrangement 162 and a shaft 164. The solenoid device 160 displaces the shaft 164 in the axial direction AD through energization of the electromagnetic arrangement 162 in response to a command outputted from the ECU to urge a spool 50 of the hydraulic oil control valve 10 described later toward the camshaft 320 against an urging force of a spring 60. As will be described later, by urging and sliding the spool 50 in the axial direction AD, it is possible to switch between an oil passage communicated with the retard chambers 141 and an oil passage communicated with the advance chambers 142. In the following explanation, the side, which is opposite to the solenoid device 160 side in the axial direction AD, will be also referred to as the camshaft 320 side for convenience.

Figure 3:
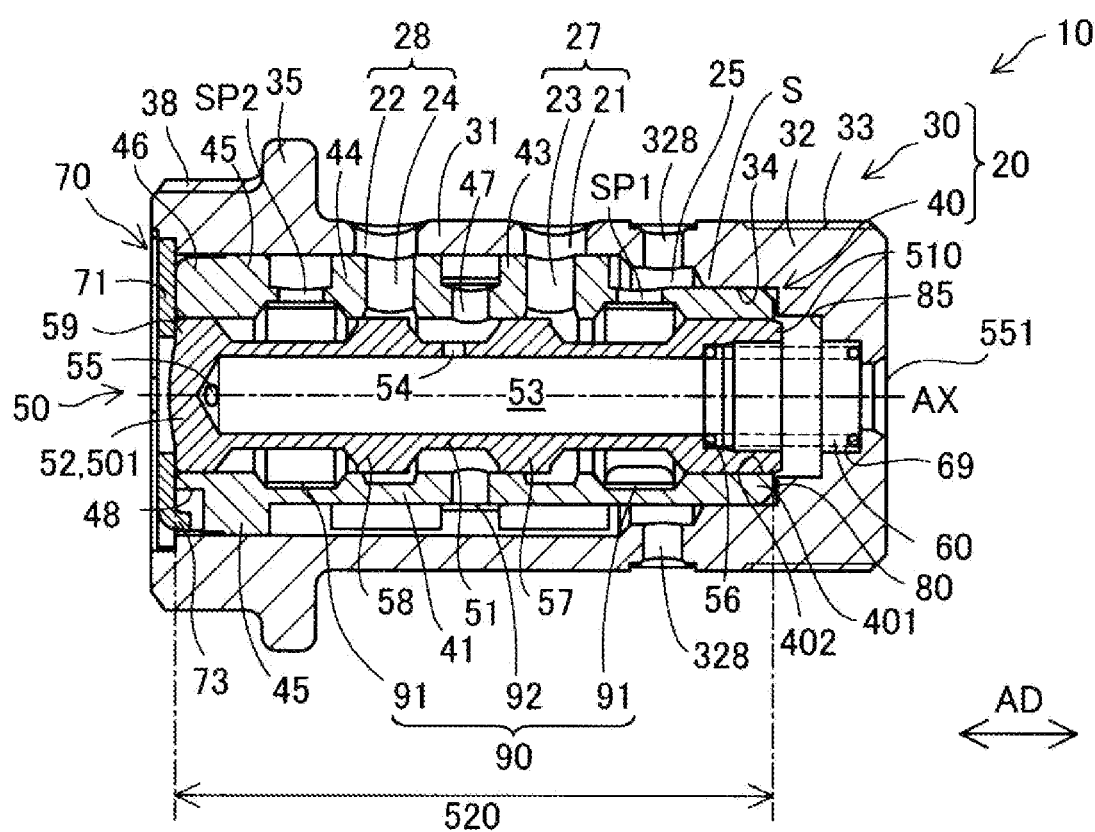
FIG. 3 is a cross-sectional view showing a detailed configuration of the valve timing adjusting device.
Figure 4:
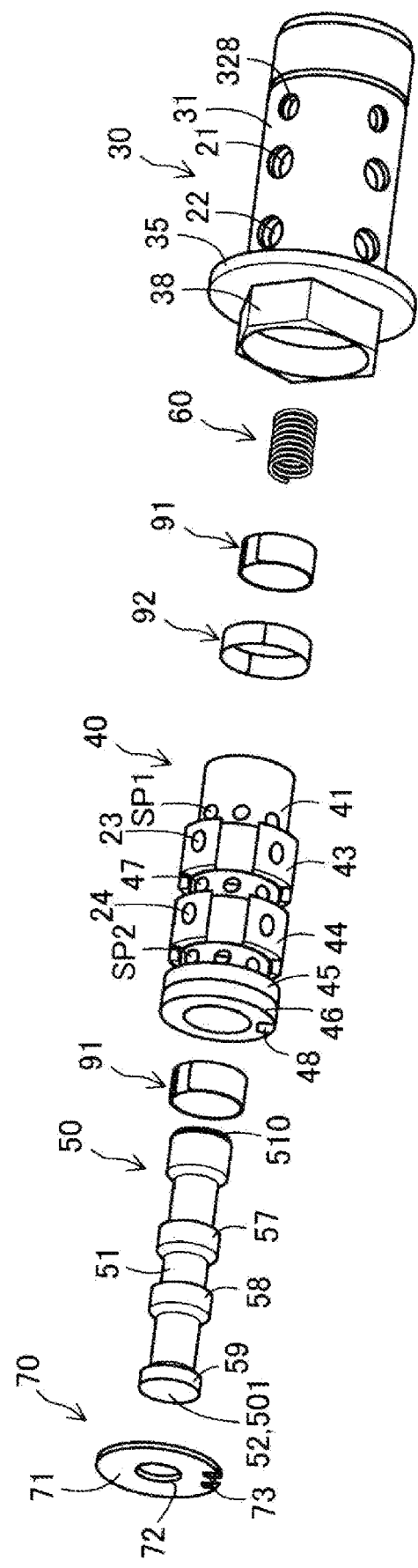
FIG. 4 is an exploded perspective view showing the detailed configuration of the hydraulic oil control valve in an exploded state.

As shown in FIGS. 3 and 4, the hydraulic oil control valve 10 includes a sleeve 20, the spool 50, the spring 60, a fixing member 70 and a plurality of check valves 90. FIG. 3 shows a cross-section taken along the rotational axis AX.

The sleeve 20 includes the outer sleeve 30 and an inner sleeve 40. The outer sleeve 30 and the inner sleeve 40 are respectively shaped in a tubular form. The sleeve 20 has a configuration in which the inner sleeve 40 is inserted into an axial hole 34 of the outer sleeve 30.

The outer sleeve 30 forms an outer shell of the hydraulic oil control valve 10 and is located on the radially outer side of the inner sleeve 40. The outer sleeve 30 includes a main body portion 31, a projecting portion 35, a fixing portion 32 and a tool engaging portion 38. The axial hole 34, which extends in the axial direction AD, is formed at the main body portion 31 and the fixing portion 32. The axial hole 34 extends through the outer sleeve 30 in the axial direction AD.

The main body portion 31 is shaped generally in a tubular form and is placed in the through-hole 136 of the vane rotor 130 as shown in FIG. 1. As shown in FIG. 4, the main body portion 31 includes a plurality of supply holes 328, a plurality of outer retard ports 21 and a plurality of outer advance ports 22. The supply holes 328 are arranged one after another in the circumferential direction and communicate between the outer peripheral surface of the main body portion 31 and the axial hole 34. The hydraulic oil is supplied from the hydraulic oil supply source 350 shown in FIG. 1 to the supply holes 328. The outer retard ports 21 shown in FIGS. 3 and 4 are located on the solenoid device 160 side of the supply holes 328 in the axial direction AD. The outer retard ports 21 are arranged one after another in the circumferential direction and communicate between the outer peripheral surface of the main body portion 31 and the axial hole 34. The outer advance ports 22 are located on the solenoid device 160 side of the outer retard ports 21 in the axial direction AD. The outer advance ports 22 are arranged one after another in the circumferential direction and communicate between the outer peripheral surface of the main body portion 31 and the axial hole 34.

The projecting portion 35 outwardly projects from the main body portion 31 in the radial direction. The vane rotor 130 shown in FIG. 1 is clamped between the projecting portion 35 and the end portion 321 of the camshaft 320 in the axial direction AD. Therefore, the projecting portion 35 contacts the vane rotor 130 in the axial direction AD and exerts an axial force.

The fixing portion 32 is shaped in a tubular form and forms an opposite end portion of the outer sleeve 30 which is opposite to the solenoid device 160 side. As shown in FIG. 1, the fixing portion 32 is inserted into the axial fixing portion 323 of the camshaft 320. A male-threaded portion 33 is formed at the fixing portion 32. The male-threaded portion 33 is threadably engaged with the female-threaded portion 324 of the axial fixing portion 323. When the male-threaded portion 33 and the female-threaded portion 324 are threadably engaged with each other, the outer sleeve 30 receives an axial force toward the camshaft 320 in the axial direction AD and is fixed to the end portion 321 of the camshaft 320. By applying the axial force, it is possible to limit a positional deviation between the hydraulic oil control valve 10 and the end portion 321 of the camshaft 320, which would be caused by an eccentric force of the camshaft 320 generated by pushing the intake valves 330, so that leakage of the hydraulic oil is limited.

As shown in FIG. 3, an inner diameter of the axial hole 34 is reduced in a stepwise manner at a location that is on the camshaft 320 side of the supply holes 328. Thereby, the axial hole 34 forms a sealing portion S, a movement limiting portion 80, a stopper 85, a spring contact portion 69 and a flow outlet 551 which are arranged in this order from the solenoid device 160 side in the axial direction at the location which is on the camshaft 320 side of the supply holes 328.

The sealing portion S separates between a supply oil passage 25 and a drain oil passage 53 described later. An inner diameter of the sealing portion S is substantially the same as an outer diameter of an end portion 401 of the inner sleeve 40 located on the camshaft 320 side. The movement limiting portion 80 is configured to contact the end portion 401 of the inner sleeve 40 located on the camshaft 320 side. The movement limiting portion 80 limits movement of the inner sleeve 40 away from the solenoid device 160 side in the axial direction AD. The stopper 85 is formed at a location where the stopper 85 opposes a distal end portion 510 of the spool 50 described later, and the stopper 85 is configured to contact the distal end portion 510. The stopper 85 defines a limit of the movement of the spool 50 in the direction away from the solenoid device 160 side. One end of the spring 60 contacts the spring contact portion 69. The flow outlet 551 corresponds to an end portion of the axial hole 34 which is opposite to the solenoid device 160 side. The flow outlet 551 is configured to discharge the hydraulic oil of the drain oil passage 53 to the outside of the hydraulic oil control valve 10 through the discharge holes 329 of the camshaft 320.

The tool engaging portion 38 is formed at a location that is on the solenoid device 160 side of the projecting portion 35 in the axial direction AD. The tool engaging portion 38 is configured to engage with a tool, such as a hexagonal socket (not shown). The tool engaging portion 38 is used to fix the hydraulic oil control valve 10, which includes the outer sleeve 30, to the end portion 321 of the camshaft 320.

As shown in FIGS. 3 and 4, the inner sleeve 40 is shaped generally in a tubular form. The inner sleeve 40 includes a tubular portion 41, a plurality of retard-side projecting walls 43, a plurality of advance-side projecting walls 44, a sealing wall 45 and a retaining end portion 46.

The tubular portion 41 is located on the radially inner side of the outer sleeve 30. The tubular portion 41 includes a plurality of retard-side supply ports SP1, a plurality of advance-side supply ports SP2 and a plurality of recycle ports 47. The retard-side supply ports SP1 are located on the camshaft 320 side of the retard-side projecting walls 43 in the axial direction AD and communicate between an outer peripheral surface and an inner peripheral surface of the tubular portion 41. In the present embodiment, the retard-side supply ports SP1 are arranged one after another in the circumferential direction in a half circumferential extent of the tubular portion 41. Alternatively, the retard-side supply ports SP1 may be arranged one after another in an entire circumferential extent of the tubular portion 41, or only one retard-side supply port SP1 may be formed at the tubular portion 41. The advance-side supply ports SP2 are located on the solenoid device 160 side of the advance-side projecting walls 44 in the axial direction AD and communicate between the outer peripheral surface and the inner peripheral surface of the tubular portion 41. In the present embodiment, the advance-side supply ports SP2 are arranged one after another in the circumferential direction in the half circumferential extent of the tubular portion 41. Alternatively, the advance-side supply ports SP2 may be arranged one after another in the entire circumferential extent of the tubular portion 41, or only one advance-side supply port SP2 may be formed at the tubular portion 41. The retard-side supply ports SP1 and the advance-side supply ports SP2 are communicated with the supply holes 326 of the camshaft 320 shown in FIG. 1. As shown in FIGS. 3 and 4, the recycle ports 47 are formed between the retard-side projecting walls 43 and the advance-side projecting walls 44 in the axial direction AD and communicate between the outer peripheral surface and the inner peripheral surface of the tubular portion 41. The recycle ports 47 are communicated with the retard-side supply ports SP1 and the advance-side supply ports SP2. Specifically, the recycle ports 47 are communicated with the supply ports SP1 through spaces, which are defined between the inner peripheral surface of the main body portion 31 of the outer sleeve 30 and the outer peripheral surface of the tubular portion 41 of the inner sleeve 40 and each of which is located between circumferentially adjacent two of the retard-side projecting walls 43, and the recycle ports 47 are communicated with the supply ports SP2 through spaces, which are defined between the inner peripheral surface of the main body portion 31 of the outer sleeve 30 and the outer peripheral surface of the tubular portion 41 of the inner sleeve 40 and each of which is located between circumferentially adjacent two of the advance-side projecting walls 44. Therefore, the recycle ports 47 function as a recycle mechanism that is configured to return the hydraulic oil, which is discharged from the retard chambers 141 and the advance chambers 142, to the supply side. In the present embodiment, although the recycle ports 47 are arranged one after another in the circumferential direction, only one recycle port 47 may be formed at the tubular portion 41. An operation of the valve timing adjusting device 100, which includes an oil passage changing operation executed by sliding of the spool 50, will be described later.

An opening 402 is formed at the end portion 401 of the tubular portion 41 which is located on the camshaft 320 side in the axial direction AD. The distal end portion 510 of the spool 50 described later is inserted into the opening 402.

The retard-side projecting walls 43 radially outwardly project from the tubular portion 41 and are arranged one after another in the circumferential direction. The space, which is located between each circumferentially adjacent two of the retard-side projecting walls 43, is communicated with the supply holes 328 and conducts the hydraulic oil supplied from the hydraulic oil supply source 350 shown in FIG. 1. As shown in FIG. 3, each of the inner retard ports 23 is formed at a corresponding one of the retard-side projecting walls 43. Each inner retard port 23 communicates between an outer peripheral surface and an inner peripheral surface of the corresponding retard-side projecting wall 43. Each inner retard port 23 is communicated with a corresponding one of the outer retard ports 21 of the outer sleeve 30. An axis of each inner retard port 23 is deviated from an axis of the corresponding outer retard port 21 in the axial direction AD.

The advance-side projecting walls 44 are located on the solenoid device 160 side of the retard-side projecting walls 43 in the axial direction AD. The advance-side projecting walls 44 radially outwardly project from the tubular portion 41 and are arranged one after another in the circumferential direction. The space, which is located between each circumferentially adjacent two of the advance-side projecting walls 44, is communicated with the supply holes 328 and conducts the hydraulic oil supplied from the hydraulic oil supply source 350 shown in FIG. 1. As shown in FIG. 3, each of the inner advance ports 24 is formed at a corresponding one of the advance-side projecting walls 44. Each inner advance port 24 communicates between an outer peripheral surface and an inner peripheral surface of the corresponding advance-side projecting wall 44. Each inner advance port 24 is communicated with a corresponding one of the outer advance ports 22 of the outer sleeve 30. An axis of each inner advance port 24 is deviated from an axis of the corresponding outer advance port 22 in the axial direction AD.

The sealing wall 45 is located on the solenoid device 160 side of the advance-side supply ports SP2 in the axial direction AD and radially outwardly projects from the tubular portion 41 and circumferentially extends all around the tubular portion 41. The sealing wall 45 seals between the inner peripheral surface of the main body portion 31 of the outer sleeve 30 and the outer peripheral surface of the tubular portion 41 of the inner sleeve 40 to limit leakage of the hydraulic oil of the supply oil passage 25 to the solenoid device 160 side. An outer diameter of the sealing wall 45 is generally the same as an outer diameter of the retard-side projecting walls 43 and an outer diameter of the advance-side projecting walls 44.

The retaining end portion 46 forms an end portion of the inner sleeve 40 located on the solenoid device 160 side. A fitting portion 48 is formed at the retaining end portion 46. In the present embodiment, the fitting portion 48 is formed by recessing one circumferential location at an outer periphery of an end surface of the retaining end portion 46 located on the solenoid device 160 side. The fitting portion 48 is fitted with a fitting projection 73 of the fixing member 70.

In the present embodiment, the supply oil passage 25 is formed by a space, which is formed between: the axial hole 34 of the outer sleeve 30; and a portion of the inner sleeve 40, which is located on the solenoid device 160 side of the sealing portion S and the camshaft 320 side of the retard-side projecting walls 43. The supply oil passage 25 is communicated with the supply holes 326 of the camshaft 320 shown in FIG. 1 and guides the hydraulic oil, which is supplied from the hydraulic oil supply source 350, to the retard-side supply ports SP1 and the advance-side supply ports SP2. As shown in FIG. 3, the outer retard ports 21 and the inner retard ports 23 form the retard ports 27 and are communicated with the retard chambers 141 through the retard oil passages 137 shown in FIG. 2. As shown in FIG. 3, the outer advance ports 22 and the inner advance ports 24 form the advance ports 28 and are communicated with the advance chambers 142 through the advance oil passages 138 shown in FIG. 2.

As shown in FIG. 3, the outer sleeve 30 and the inner sleeve 40 are sealed at least a portion thereof located in the axial direction AD to limit leakage of the hydraulic oil. More specifically, the retard-side projecting walls 43 seal between: the retard-side supply ports SP1 and the recycle ports 47; and the retard ports 27, and the advance-side projecting walls 44 seal between the advance-side supply ports SP2 and the recycle ports 47; and the advance ports 28. Furthermore, the sealing wall 45 seals between the supply oil passage 25 and the outside of the hydraulic oil control valve 10. Furthermore, the sealing portion S seals between the supply oil passage 25 and the drain oil passage 53 described later.

The spool 50 is placed on the radially inner side of the inner sleeve 40. The spool 50 is driven to slide in the axial direction AD by the solenoid device 160 that is in contact with a spool bottom 52 of the spool 50 located at one end of the spool 50.

The spool 50 includes a spool tubular portion 51, the spool bottom 52, a spring receiving portion 56 and the distal end portion 510. Furthermore, the spool 50 includes an axial hole that extends in the axial direction AD. This axial hole forms a portion of the drain oil passage 53 described later. Furthermore, the spool 50 includes a drain flow inlet 54 and a drain flow outlet 55 which are communicated with the axial hole of the spool 50.

Figure 5:
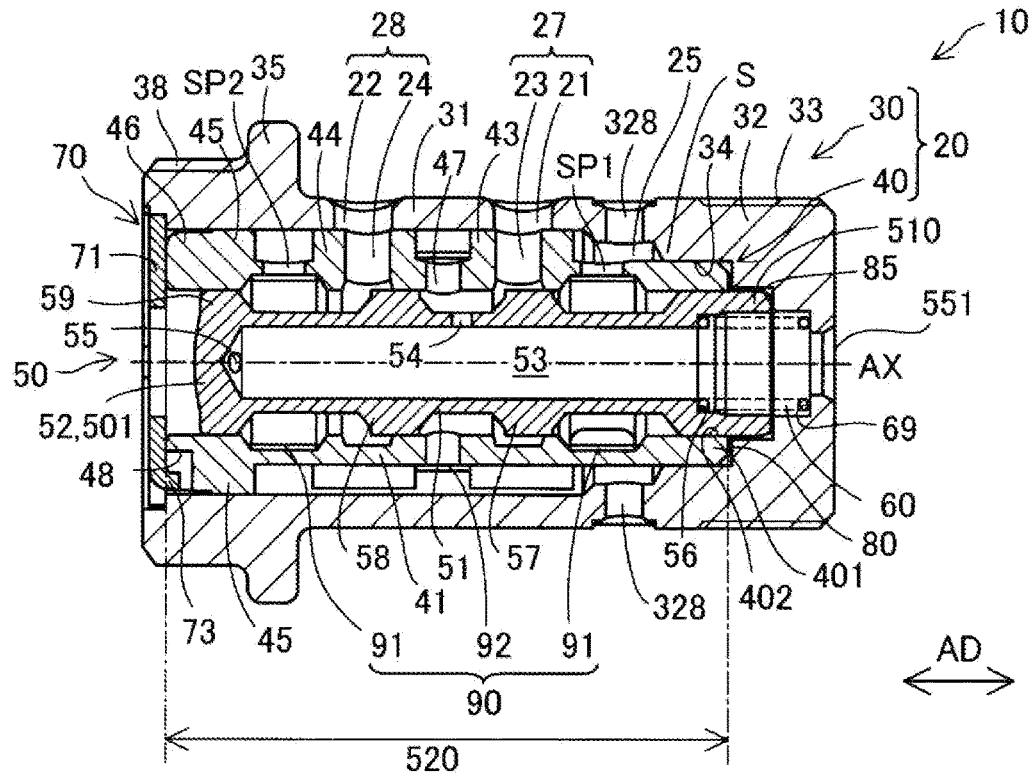
FIG. 5 is a cross-sectional view showing a state where a spool contacts a stopper.

As shown in FIGS. 3 and 4, the spool tubular portion 51 is shaped generally in a tubular form. A retard-side sealing portion 57 and an advance-side sealing portion 58 are arranged in this order in the axial direction AD from the camshaft 320 side at an outer peripheral surface of the spool tubular portion 51 such that the retard-side sealing portion 57 and the advance-side sealing portion 58 radially outwardly project from the spool tubular portion 51 and circumferentially extend all around the spool tubular portion 51. In a state where the spool 50 is positioned closest to the electromagnetic arrangement 162 of the solenoid device 160 as shown in FIG. 3, the retard-side sealing portion 57 blocks the communication between the recycle ports 47 and the retard ports 27. In another state where the spool 50 is positioned farthest from the electromagnetic arrangement 162 as shown in FIG. 5, the retard-side sealing portion 57 blocks the communication between the retard-side supply ports SP1 and the retard ports 27. In the state where the spool 50 is positioned closest to the electromagnetic arrangement 162 of the solenoid device 160 as shown in FIG. 3, the advance-side sealing portion 58 blocks the communication between the advance-side supply ports SP2 and the advance ports 28. In the other state where the spool 50 is positioned farthest from the electromagnetic arrangement 162 as shown in FIG. 5, the advance-side sealing portion 58 blocks the communication between the recycle ports 47 and the advance ports 28.

The spool bottom 52 forms one end 501 of the spool 50 located on the solenoid device 160 side in the axial direction AD. The spool bottom 52 is formed integrally with the spool tubular portion 51 in one-piece and closes the end portion of the spool tubular portion 51 located on the solenoid device 160 side. The shaft 164 of the solenoid device 160 shown in FIG. 1 contacts the spool bottom 52. As shown in FIG. 3, a retaining portion 59 is formed at the spool bottom 52 and circumferentially extends all around the spool bottom 52. The retaining portion 59 radially outwardly projects. The retaining portion 59 defines a limit of the slide movement of the spool 50 in a direction toward the electromagnetic arrangement 162 of the solenoid device 160 shown in FIG. 1 when the retaining portion 59 contacts the fixing member 70.

As shown in FIG. 3, the spring receiving portion 56 is located on an opposite side of the spool 50 which is opposite to the one end 501, and the spring receiving portion 56 has an inner diameter which is larger than the rest of the spool tubular portion 51. The other end of the spring 60 contacts the spring receiving portion 56.

The distal end portion 510 forms an end portion of the spool 50 located on the camshaft 320 side. The distal end portion 510 is formed as an opening and communicates between the inside of the spool 50 and a portion of the axial hole 34 located on the camshaft 320 side of the movement limiting portion 80. The distal end portion 510 is inserted into the opening 402 of the end portion 401 of the inner sleeve 40.

A space, which is surrounded by the spool tubular portion 51, the spool bottom 52 and the outer sleeve 30, functions as the drain oil passage 53. Therefore, at least a portion of the drain oil passage 53 is formed at the inside of the spool 50. The hydraulic oil, which is discharged from the retard chambers 141 and the advance chambers 142, flows through the drain oil passage 53.

The drain flow inlet 54 is formed at the spool tubular portion 51 and is located between the retard-side sealing portion 57 and the advance-side sealing portion 58 in the axial direction AD. The drain flow inlet 54 communicates between the outer peripheral surface and the inner peripheral surface of the spool tubular portion 51. The drain flow inlet 54 guides the hydraulic oil, which is discharged from the retard chambers 141 and the advance chambers 142, to the drain oil passage 53. Furthermore, the drain flow inlet 54 is communicated with each supply port SP1, SP2 through the recycle ports 47. At this time, the recycle ports 47 are communicated with each supply port SP1, SP2 through the corresponding spaces where the retard-side projecting walls 43 and the advance-side projecting walls 44 are not formed at the outer peripheral surface of the inner sleeve 40. The drain flow outlet 55 forms an opening at the spool bottom 52 which is the one end 501 of the spool 50. The drain flow outlet 55 is configured to discharge the hydraulic oil of the drain oil passage 53 to the outside of the hydraulic oil control valve 10. As shown in FIG. 1, the hydraulic oil, which is discharged from the drain flow outlet 55, is received in the oil pan 352. Furthermore, as described above, the hydraulic oil of the drain oil passage 53 is also discharged from the flow outlet 551 of the outer sleeve 30 to the outside of the hydraulic oil control valve 10.

In the present embodiment, the outer sleeve 30 and the spool 50 are each made of iron, and the inner sleeve 40 is made of aluminum. However, these components are not necessarily made of these materials and may be made of any metal or resin material.

The spring 60 shown in FIG. 3 is a compression coil spring and is positioned such that the ends of the spring 60 contact the spring contact portion 69 of the outer sleeve 30 and the spring receiving portion 56 of the spool 50, respectively. The spring 60 urges the spool 50 toward the solenoid device 160 in the axial direction AD. The fixing member 70 is fixed to the end portion of the outer sleeve 30 located on the solenoid device 160 side. The fixing member 70 is shaped in a thin plate form and includes a planar plate portion 71 and the fitting projection 73. The planar plate portion 71 is shaped in a planar plate form that extends in the radial direction. The planar plate portion 71 does not necessarily extend in the radial direction and may extend in a direction that crosses the axial direction AD. An opening 72 is formed generally at a center of the planar plate portion 71. The fitting projection 73 is formed by bending a portion of the planar plate portion 71 so that the fitting projection 73 projects from the planar plate portion 71 in the axial direction AD. The fitting projection 73 is fitted to the fitting portion 48 of the inner sleeve 40.

The fixing member 70 is swaged and fixed to the outer sleeve 30 after inserting the spool 50 into the inside of the inner sleeve 40 and fitting the fitting projection 73 to the fitting portion 48. An outer periphery of an end surface of the fixing member 70 located on the solenoid device 160 side functions as a swaging portion that is swaged and fixed to the outer sleeve 30. When the fixing member 70 is fixed to the outer sleeve 30 in the state where the fitting projection 73 is fitted to the fitting portion 48, rotation of the inner sleeve 40 relative to the outer sleeve 30 in the circumferential direction is limited. Furthermore, when the fixing member 70 is fixed to the outer sleeve 30, removal of the inner sleeve 40 and the spool 50 from the outer sleeve 30 toward the solenoid device 160 in the axial direction AD is limited. The check valves 90 are configured to limit reverse flow of the hydraulic oil.

The check valves 90 include two supply check valves 91 and a recycle check valve 92. As shown in FIG. 4, the supply check valves 91 and the recycle check valve 92 are respectively formed by winding a rectangular thin plate into a ring form and are resiliently deformable in the radial direction. As shown in FIG. 3, the supply check valves 91 are respectively placed at a location corresponding to the retard-side supply ports SP1 and a location corresponding to the advance-side supply ports SP2 and contact the inner peripheral surface of the tubular portion 41. When the supply check valve 91 receives a pressure of the hydraulic oil from the radially outer side of the supply check valve 91, a size of an overlapping portion of the wound thin plate of the supply check valve 91 is increased and to shrink in the radial direction. The recycle check valve 92 is placed at a location corresponding to the recycle ports 47 and contact the outer peripheral surface of the tubular portion 41. When the recycle check valve 92 receives a pressure of the hydraulic oil from the radially inner side of the recycle check valve 92, a size of an overlapping portion of the wound thin plate of the recycle check valve 92 is increased to expand in the radial direction.

In the present embodiment, the crankshaft 310 corresponds to a subordinate concept of a drive shaft of the present disclosure, and the camshaft 320 corresponds to a subordinate concept of a driven shaft of the present disclosure. Furthermore, the intake valves 330 correspond to a subordinate concept of valves of the present disclosure. Furthermore, the solenoid device 160 corresponds to a subordinate concept of the actuator of the present disclosure, and the vane rotor 130 corresponds to a subordinate concept of a phase shifter of the present disclosure.

A-2. Operation of Valve Timing Adjusting Device:

As shown in FIG. 1, the hydraulic oil, which is supplied from the hydraulic oil supply source 350 to the supply holes 326, flows to the supply oil passage 25 through the axial hole 322. The retard ports 27 are communicated with the retard-side supply ports SP1 in the state like the state of FIG. 3 where the solenoid device 160 is not energized, and thereby the retaining portion 59 of the spool 50 contacts the fixing member 70, and the spool 50 is positioned closest to the electromagnetic arrangement 162 of the solenoid device 160. Therefore, the hydraulic oil of the supply oil passage 25 is supplied to the retard chambers 141 so that the vane rotor 130 is rotated in the retarding direction relative to the housing 120, and the relative rotational phase of the camshaft 320 relative to the crankshaft 310 is changed to the retard side. Furthermore, in this state, the advance ports 28 are not communicated with the advance-side supply ports SP2 but are communicated with the recycle ports 47. Therefore, the hydraulic oil, which is discharged from the advance chambers 142, is recirculated to the retard-side supply ports SP1 through the recycle ports 47. Furthermore, a portion of the hydraulic oil, which is discharged from the advance chambers 142, flows into the drain oil passage 53 through the drain flow inlet 54 and is returned to the oil pan 352 through the drain flow outlet 55.

As shown in FIG. 5, the advance ports 28 are communicated with the advance-side supply ports SP2 in the state where the solenoid device 160 is energized, and thereby the distal end portion 510 of the spool 50 contacts the stopper 85, and the spool 50 is positioned farthest from the electromagnetic arrangement 162 of the solenoid device 160, i.e., in the state where the spool 50 contacts the stopper 85. Therefore, the hydraulic oil of the supply oil passage 25 is supplied to the advance chambers 142 so that the vane rotor 130 is rotated in the advancing direction relative to the housing 120, and the relative rotational phase of the camshaft 320 relative to the crankshaft 310 is changed to the advance side. Furthermore, in this state, the retard ports 27 are not communicated with the retard-side supply ports SP1 but are communicated with the recycle ports 47. Therefore, the hydraulic oil, which is discharged from the retard chambers 141, is recirculated to the advance-side supply ports SP2 through the recycle ports 47. Furthermore, a portion of the hydraulic oil, which is discharged from the retard chambers 141, flows into the drain oil passage 53 through the drain flow inlet 54 and is returned to the oil pan 352 through the drain flow outlet 55.

Figure 6:
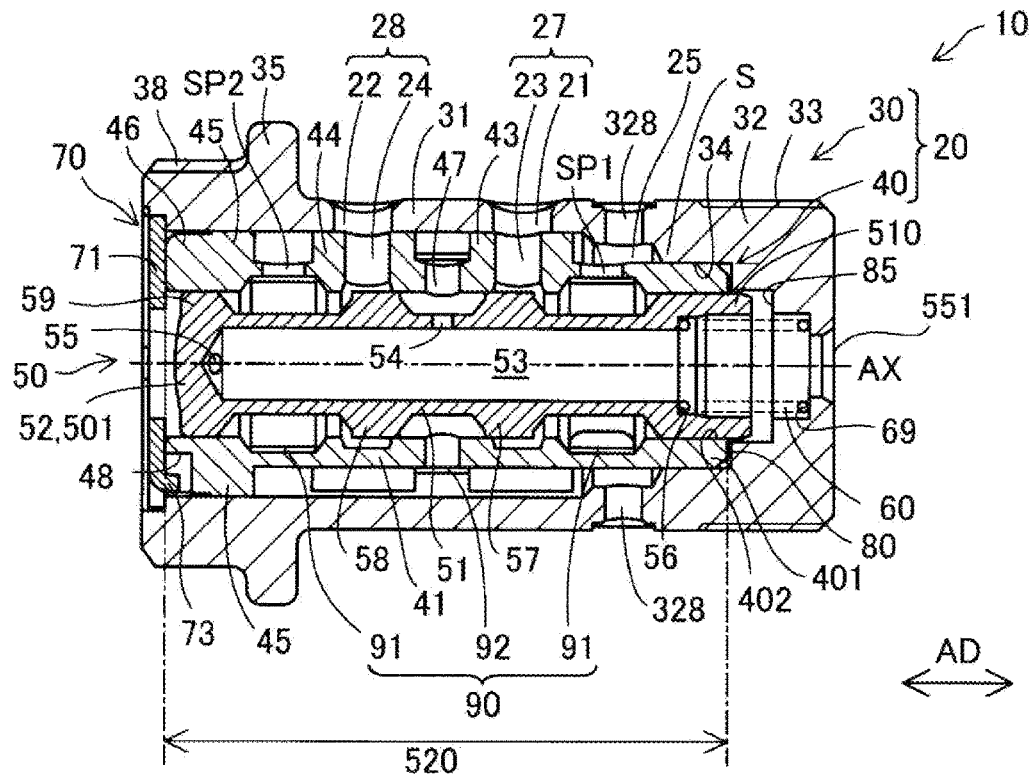
FIG. 6 is a cross-sectional view showing a state where the spool is placed generally at a center of a slide range of the spool.

Furthermore, as shown in FIG. 6, in the state where the solenoid device 160 is energized, and the spool 50 is placed generally at a center of a slide range of the spool 50, the retard ports 27 are communicated with the retard-side supply ports SP1, and the advance ports 28 are communicated with the advance-side supply ports SP2. Therefore, the hydraulic oil of the supply oil passage 25 is supplied to both of the retard chambers 141 and the advance chambers 142, and thereby the relative rotation of the vane rotor 130 relative to the housing 120 is limited. Thus, the current relative rotational phase of the camshaft 320 relative to the crankshaft 310 is maintained.

As described above, the spool 50 slides in the axial direction AD through the energization of the solenoid device 160. In the movable range of the spool 50 that is from the position, at which the retaining portion 59 of the spool 50 contacts the fixing member 70, to the position, at which the distal end portion 510 of the spool 50 contacts the stopper 85, the slide range 520 of the spool 50 is set to be a range, in which the inner sleeve 40 is placed on the radially outer side of the spool 50 and functions as a bearing for slidably supporting the spool 50. Therefore, in the present embodiment, the stopper 85 is placed at the outside of the slide range 520 in the axial direction AD. Furthermore, in the present embodiment, as shown in FIG. 5, the distal end portion 510 projects from the opening 402 toward the camshaft 320 in the state where the distal end portion 510 of the spool 50 contacts the stopper 85, i.e., the state where the spool 50 is positioned farthest from the electromagnetic arrangement 162 of the solenoid device 160.

The hydraulic oil, which is supplied to the retard chambers 141 or the advance chambers 142, flows into the receiving hole 132 through the retard-chamber-side pin control oil passage 133 or the advance-chamber-side pin control oil passage 134. Therefore, when a sufficient hydraulic pressure is exerted in the retard chambers 141 or the advance chambers 142, the lock pin 150 is removed from the fitting recess 128 against the urging force of the spring 151 by the hydraulic oil supplied into the receiving hole 132. Thus, the rotation of the vane rotor 130 relative to the housing 120 is enabled.

In a case where the relative rotational phase of the camshaft 320 is on the advance side of a target value, the vane rotor 130 is rotated in the retarding direction relative to the housing 120 at the valve timing adjusting device 100 by reducing the amount of electric power supplied to the solenoid device 160. Therefore, the relative rotational phase of the camshaft 320 relative to the crankshaft 310 is changed toward the retard side, and thereby the valve timing is retarded. Furthermore, in a case where the relative rotational phase of the camshaft 320 is on the retard side of the target value, the vane rotor 130 is rotated in the advancing direction relative to the housing 120 at the valve timing adjusting device 100 by increasing the amount of electric power supplied to the solenoid device 160. Therefore, the relative rotational phase of the camshaft 320 relative to the crankshaft 310 is changed toward the advance side, and thereby the valve timing is advanced. Furthermore, in a case where the relative rotational phase of the camshaft 320 coincides the target value, the rotation of the vane rotor 130 relative to the housing 120 is limited at the valve timing adjusting device 100 by setting the amount of electric power supplied to the solenoid device 160 to an intermediate level. Therefore, the current relative rotational phase of the camshaft 320 relative to the crankshaft 310 is maintained, and the current valve timing is maintained.

In the hydraulic oil control valve 10 of the valve timing adjusting device 100 according to the first embodiment described above, the distal end portion 510 projects from the opening 402 toward the camshaft 320 in the state where the distal end portion 510 of the spool 50 is inserted in the opening 402 of the inner sleeve 40, and the spool 50 is positioned farthest from the solenoid device 160 side. Therefore, the position of the end portion 401 of the inner sleeve 40 can be placed on the solenoid device 160 side of the stopper 85 in the axial direction AD, and thereby the length of the inner sleeve 40 measured in the axial direction AD can be reduced. Thus, the location of the end portion 401 of the inner sleeve 40 can be closer to the solenoid device 160 in comparison to the configuration, in which the stopper for limiting the movable range of the spool 50 is placed in the inner sleeve 40 at the position where the stopper is opposed to the distal end portion 510 of the spool 50. As a result, it is possible to limit an increase in the size of the inner sleeve 40 measured in the axial direction AD, and thereby it is possible to limit an increase in the size of the hydraulic oil control valve 10 measured in the axial direction AD. As a result, the mountability of the hydraulic oil control valve 10 and the valve timing adjusting device 100 can be improved.

Furthermore, since the increase in the size of the inner sleeve 40 measured in the axial direction AD can be limited, an increase in the manufacturing costs of the inner sleeve 40 can be limited. Furthermore, since the stopper 85, which is configured to contact the spool 50, is provided, the limit of the movement of the spool 50 can be easily defined.

Furthermore, since the stopper 85 is formed integrally with the outer sleeve 30 in one-piece as the part of the outer sleeve 30, it is possible to limit an increase in the number of components. Furthermore, since the stopper 85 is placed at the outside of the slide range 520 of the spool 50 in the axial direction AD, it is possible to limit deterioration in the slidability of the spool 50 in, for example, a case where the stopper 85 is deformed, or a case where the surface of the distal end portion 510 of the spool 50, which contacts the stopper 85, is deformed. Furthermore, since the stopper 85 is placed at the outside of the slide range 520 of the spool 50 in the axial direction AD, the inner diameter of the inner sleeve 40 can be set to be larger than the outer diameter of the spool 50 along the entire length of the inner sleeve 40 in the axial direction AD.

Therefore, since a portion of the inner sleeve 40 that protrudes radially inward beyond the outer diameter of the spool 50 is eliminated, the inner surface of the inner sleeve 40 can be easily machined using grinding, reaming, etc. Therefore, in the slide range 520 where dimensional accuracy is required, complication of the machining process of the inner surface can be limited. Thus, an increase in the manufacturing costs of the inner sleeve 40 can be limited.

Furthermore, since at least the portion of the drain oil passage 53 is formed at the spool 50, a size of the passage cross-sectional area of the drain oil passage 53 can be increased. Furthermore, since the flow outlet 551 is formed at the end portion of the outer sleeve 30 located on the camshaft 320 side, the drain oil passage 53 can be formed along the rotational axis AX. Thus, complication of the configuration of the drain oil passage 53 can be limited. As a result, an increase in the flow resistance of the flow passage at the time of discharging the hydraulic oil to the outside of the hydraulic oil control valve 10 can be limited. Thereby, it is possible to limit deterioration in the performance of the hydraulic oil control valve 10, such as a delay in the operation of the hydraulic oil control valve 10. Furthermore, in comparison to the configuration, in which the inside of the spool is used to function as the supply oil passage, it is possible to limit application of the hydraulic pressure to the spool 50 caused by the supply of the hydraulic oil, and thereby it is possible to limit the deterioration in the slidability of the spool 50.

Furthermore, since the sleeve 20 has the double structure consisting of the outer sleeve 30 and the inner sleeve 40, each port SP1, SP2, 23, 24, 47 can be easily formed at the inner sleeve 40. Thus, the machinability of each port SP1, SP2, 27, 28, 47 at the sleeve 20 can be improved, and thereby it is possible to limit complication of the manufacturing process of the sleeve 20. Furthermore, since such machinability can be improved, the degree of freedom in the design of each port SP1, SP2, 27, 28, 47 can be improved. Thus, the mountability of the hydraulic oil control valve 10 and valve timing adjusting device 100 can be improved.

B. Second Embodiment

Figure 7:
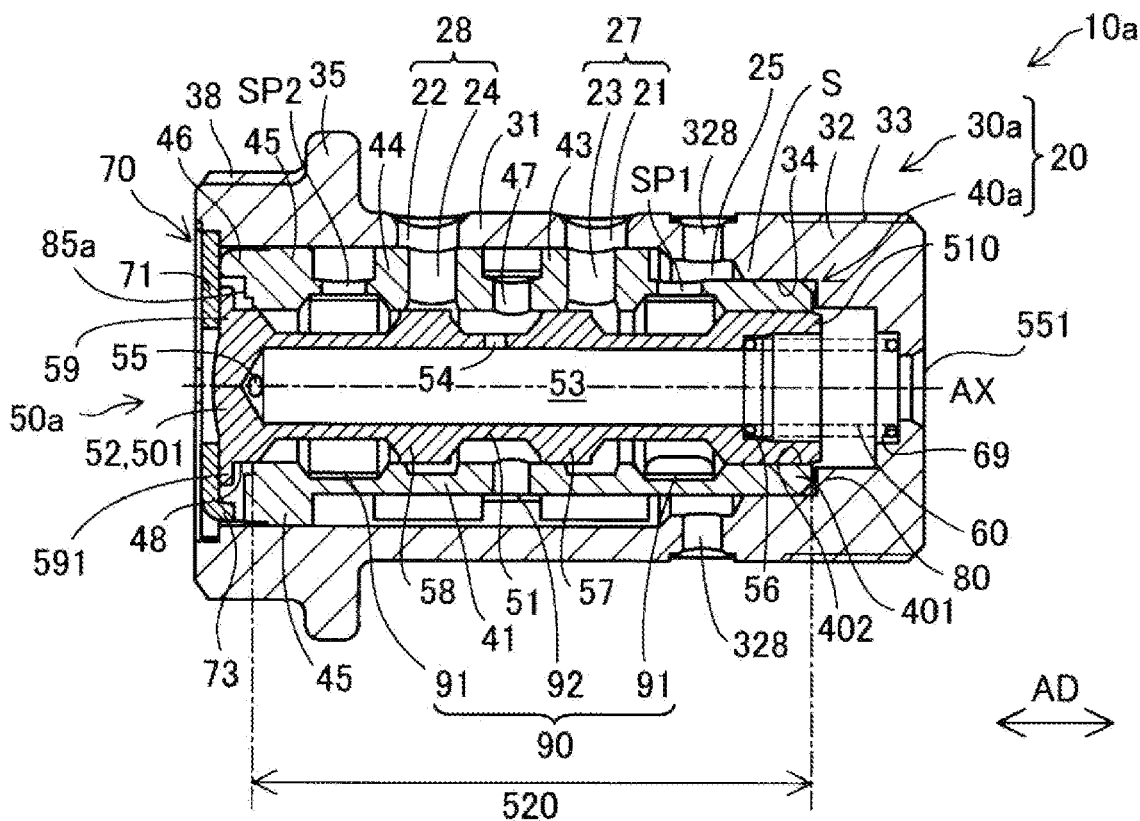
FIG. 7 is a cross-sectional view showing a schematic configuration of a hydraulic oil control valve according to a second embodiment.

A hydraulic oil control valve 10a of a second embodiment shown in FIG. 7 differs from the hydraulic oil control valve 10 of the first embodiment with respect to provision of an outer sleeve 30a in place of the outer sleeve 30, provision of an inner sleeve 40a in place of the inner sleeve 40 and provision of a spool 50a in place of the spool 50. Other parts are the same as in the first embodiment, so identical parts are indicated by the same reference signs, and their detailed descriptions are omitted.

In the hydraulic oil control valve 10a of the second embodiment, the portion of the hydraulic oil control valve 10 of the first embodiment, which functions as the stopper 85, does not have a function of the stopper. In the hydraulic oil control valve 10a of the second embodiment, a stopper 85a is formed at the retaining end portion 46 of the inner sleeve 40a in place of the stopper 85. The stopper 85a is formed by increasing the inner diameter of the retaining end portion 46 in comparison to the inner diameter of the sealing wall 45. The stopper 85a defines a limit of the movement of the spool 50a in the direction away from the solenoid device (not shown in FIG. 7) side. The spool 50a further includes a base end portion 591. The base end portion 591 radially outwardly projects from the retaining portion 59 of the spool 50a.

In the present embodiment, the retaining end portion 46 corresponds to a subordinate concept of the end portion of the inner sleeve of the present disclosure located on the actuator side.

The base end portion 591 of the spool 50a contacts the stopper 85a in the state, which is different from the state shown in FIG. 7 and in which the spool 50a is positioned farthest from the electromagnetic arrangement of the solenoid device (not shown in FIG. 7) upon energization of the solenoid device. In this state, the distal end portion 510 of the spool 50a projects from the opening 402 of the inner sleeve 40a toward the camshaft 320.

The hydraulic oil control valve 10a of the second embodiment described above can have advantages which are similar to those of the hydraulic oil control valve 10 of the first embodiment. In addition, the base end portion 591, which is formed at the one end 501 of the spool 50a and outwardly projects in the radial direction, is configured to contact the stopper 85a formed at the retaining end portion 46 of the inner sleeve 40a. Therefore, in the outer sleeve 30a, it is possible to eliminate the stopper, which is configured to contact the distal end portion 510 of the spool 50a, and it is possible to limit an increase in the size of the outer sleeve 30a measured in the axial direction AD. Thus, it is possible to limit an increase in the size of the hydraulic oil control valve 10a measured in the axial direction AD, and it is possible to further improve the mountability of the hydraulic oil control valve 10a and the valve timing adjusting device 100.

Furthermore, since the base end portion 591 is formed to outwardly project in the radial direction from the retaining portion 59 of the spool 50a, a contact surface area of the base end portion 591, which is configured to contact the stopper 85a, can be increased. Thus, in the hydraulic oil control valve 10a, which has the recycle mechanism that includes the recycle ports 47, the sufficient contact surface area between the spool 50a and the stopper 85a can be ensured. Therefore, the influence of the hydraulic pressure of the hydraulic oil caused by the recycle mechanism can be mitigated.

C. Other Embodiments

Figure 8:
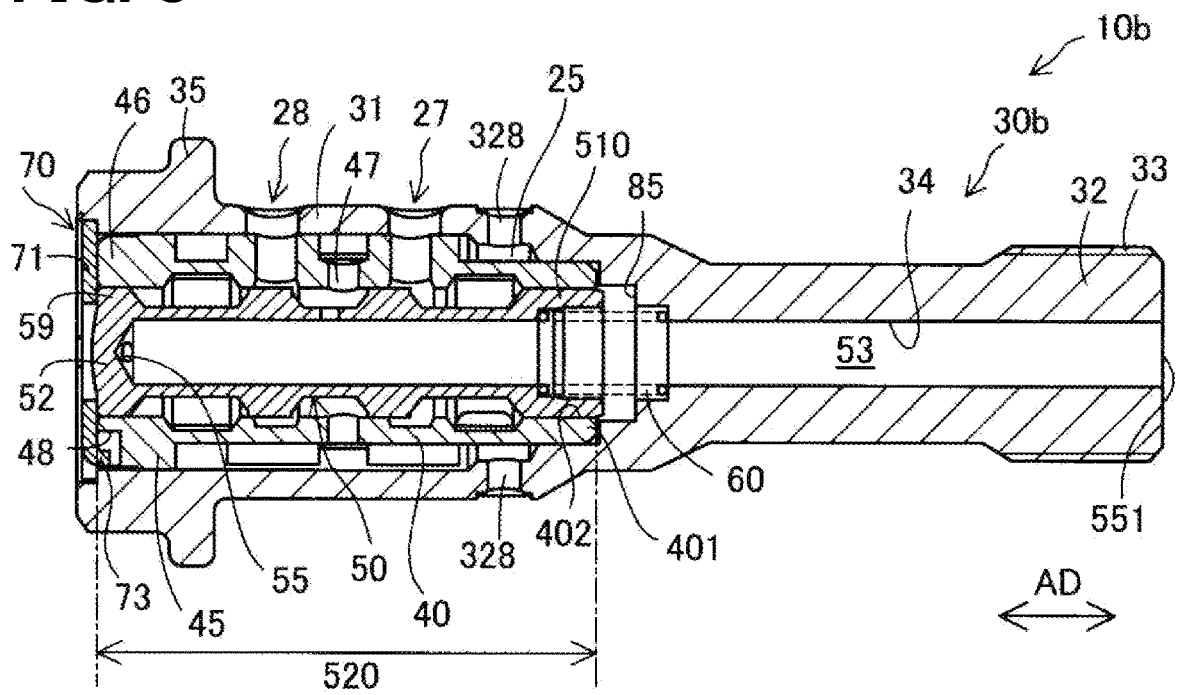
FIG. 8 is a cross-sectional view showing a schematic configuration of a hydraulic oil control valve according to another embodiment 1.

The configuration of the outer sleeve 30, 30a of each of the above embodiments is only an example and can be changed in various ways. For example, as in a hydraulic oil control valve 10b of another embodiment 1 shown in FIG. 8, a length of the outer sleeve 30b measured in the axial direction AD can be increased according to the configuration of the end portion 321 of the camshaft 320 (not shown in FIG. 8). Even with this configuration, since an increase in the size of the inner sleeve 40 measured in the axial direction AD is limited, the degree of freedom in the design of the outer sleeve 30b can be improved.

In the first embodiment, the stopper 85 is formed integrally with the outer sleeve 30 in one-piece as the part of the outer sleeve 30. Alternatively, the stopper 85 may be replaced with a stopper member, which is formed separately from the outer sleeve 30 and is installed in the axial hole 34. This stopper member may be press fitted into the axial hole 34 or may be fixed to the outer sleeve 30 by, for example, welding.

Furthermore, the stopper member may be formed by a pin that is inserted from the radially outer side to the radially inner side at the outer sleeve 30. Specifically, in general, the stopper may be provided to the outer sleeve and may be configured to contact the distal end portion of the spool. Even with this configuration, advantages, which are similar to those of the first embodiment, can be achieved. In addition, complication of the configuration of the outer sleeve 30 can be limited.

The hydraulic oil control valve 10, 10a of each of the above embodiments includes the stopper 85, 85a. Alternatively, the stopper 85, 85a may be eliminated from the hydraulic oil control valve 10, 10a. In such a case, the limit of the movement of the spool 50, 50a in the direction away from the solenoid device 160 may be defined by a stopper provided to the electromagnetic arrangement 162 of the solenoid device 160 or may be defined by adjusting the number of turns of the coil of the electromagnetic arrangement 162 of the solenoid device 160. Even with this configuration, advantages, which are similar to those of each of the above embodiments, can be achieved. In each of the above embodiments, the spring 60 is arranged such that the one end of the spring 60 contacts the spring contact portion 69 of the outer sleeve 30, 30a, and the other end of the spring 60 contacts the spring receiving portion 56 of the spool 50, 50a. Alternatively, the spring 60 may be placed at the one end 501 side of the spool 50, 50a. For example, the spring 60 may be arranged between the bottom of the spool 50, 50a and the electromagnetic arrangement 162 of the solenoid device 160. Even with this configuration, advantages, which are similar to those of each of the above embodiments, can be achieved. In addition, since the spring contact portion 69 of the outer sleeve 30, 30a can be eliminated, it is possible to further limit the increase in the size of the outer sleeve 30, 30a measured in the axial direction AD, and thereby it is possible to further limit the increase in the size of the hydraulic oil control valve 10, 10a.

The configuration of the hydraulic oil control valve 10, 10a of each of the above embodiments is only an example and can be changed in various ways. For example, the recycle mechanism using the recycle ports 47 may be eliminated. Furthermore, one of the drain flow outlet 55 and the flow outlet 551 may be eliminated. Furthermore, the inside of the spool 50, 50a may be configured as the supply oil passage 25. Furthermore, for example, the hydraulic oil control valve 10, 10a of each of the above embodiments is fixed to the end portion 321 of the camshaft 320 by threadably engaging the male-threaded portion 33 to the female-threaded portion 324. Alternatively, the hydraulic oil control valve 10, 10a may be fixed to the end portion 321 of the camshaft 320 by any other appropriate fixing method, such as welding. Furthermore, the hydraulic oil control valve 10, 10a is not necessarily driven by the solenoid device 160 but may be driven by any other type of actuator, such as an electric motor or a pneumatic cylinder. Even with this configuration, advantages, which are similar to those of each of the above embodiments, can be achieved.

In each of the above embodiments, the valve timing adjusting device 100 is configured to adjust the valve timing of the intake valves 330 which are driven to open and close by the camshaft 320. Alternatively, the valve timing adjusting device 100 may be configured to adjust a valve timing of the exhaust valves 340. Furthermore, the valve timing adjusting device 100 may be used such that the valve timing adjusting device 100 is fixed to the end portion of the camshaft (serving as the driven shaft) 320 that receives the drive force from the crankshaft (serving as the drive shaft) 310 through an intermediate shaft. Alternatively, the valve timing adjusting device 100 may be used such that the valve timing adjusting device 100 is installed to an end portion of one of a drive shaft and a driven shaft of a dual structure camshaft.

The present disclosure is not limited to the above-described embodiments and can be realized in various configurations without departing from the principle of the present disclosure. For example, the technical features of each embodiment, which corresponds to the technical features in the summary section of the present disclosure, may be replaced or combined as appropriate to address some or all of the disadvantages described above or to achieve some or all of the advantages described above. If the technical feature is not described as essential in the specification, it can be deleted as appropriate.

What is claimed is:

1. A hydraulic oil control valve configured to control flow of a hydraulic oil supplied from a hydraulic oil supply source and to be placed along a rotational axis of a valve timing adjusting device, wherein the valve timing adjusting device is fixed to an end portion of one of a drive shaft and a driven shaft to adjust a valve timing of another valve, and the driven shaft receives a drive force from the drive shaft to open and close the another valve, the hydraulic oil control valve comprising:
    a sleeve that is shaped in a tubular form; and
    a spool that is configured to be driven by an actuator such that the spool slides in an axial direction at a location that is on an inner side of the sleeve in a radial direction while the actuator contacts one end of the spool, wherein:
    the sleeve includes:
        an inner sleeve that is placed on an outer side of the spool in the radial direction and has an opening formed at an end portion of the inner sleeve which is opposite to the actuator in the axial direction, wherein a distal end portion of the spool is inserted in the opening of the inner sleeve; and
        an outer sleeve that has an axial hole which extends in the axial direction, wherein the inner sleeve is inserted in at least a portion of the axial hole;
    an end portion of the inner sleeve, which is located on a side where the driven shaft is placed, contacts a movement limiting portion of the outer sleeve in the axial direction; and
    in a state where the spool is positioned farthest from the actuator, the distal end portion projects from the opening and the movement limiting portion toward a side that is opposite to the actuator.

2. The hydraulic oil control valve according to claim 1, wherein:
    the spool includes:
        at least a portion of a drain oil passage configured to conduct the hydraulic oil discharged from a phase shifter of the valve timing adjusting device; and
        a drain flow inlet that is configured to guide the hydraulic oil, which is discharged from the phase shifter, to the drain oil passage; and
    a flow outlet, which is configured to discharge the hydraulic oil of the drain oil passage to an outside of the hydraulic oil control valve, is formed at an end portion of the outer sleeve which is opposite to the actuator.

3. The hydraulic oil control valve according to claim 1, further comprising a stopper that is configured to contact the spool and defines a limit of movement of the spool in a direction away from the actuator, wherein:
    the stopper is placed at an outside of a slide range of the spool in the axial direction.

4. The hydraulic oil control valve according to claim 3, wherein the stopper is formed at the outer sleeve and is configured to contact the distal end portion.

5. The hydraulic oil control valve according to claim 3, wherein:
    the spool has a base end portion that is formed at the one end of the spool and outwardly projects in the radial direction; and
    the stopper is formed at an end portion of the inner sleeve located on a side where the actuator is placed, wherein the stopper is configured to contact the base end portion.

6. The hydraulic oil control valve according to claim 5, wherein:
    a supply port, which is communicated with the hydraulic oil supply source, is formed at the inner sleeve;
    the spool includes:
        at least a portion of a drain oil passage configured to conduct the hydraulic oil discharged from a phase shifter of the valve timing adjusting device; and
        a drain flow inlet that is configured to guide the hydraulic oil, which is discharged from the phase shifter, to the drain oil passage; and
    the drain flow inlet and the supply port are communicated with each other.

7. A valve timing adjusting device comprising the hydraulic oil control valve of claim 1.

8. A hydraulic oil control valve configured to control flow of a hydraulic oil supplied from a hydraulic oil supply source and to be placed along a rotational axis of a valve timing adjusting device, wherein the valve timing adjusting device is fixed to an end portion of one of a drive shaft and a driven shaft to adjust a valve timing of another valve, and the driven shaft receives a drive force from the drive shaft to open and close the another valve, the hydraulic oil control valve comprising:

a sleeve that is shaped in a tubular form; and a spool that is configured to be driven by an actuator such that the spool slides in an axial direction at a location that is on an inner side of the sleeve in a radial direction while the actuator contacts one end of the spool, wherein:

the sleeve includes:

an inner sleeve that is placed on an outer side of the spool in the radial direction and has an opening formed at an end portion of the inner sleeve which is opposite to the actuator in the axial direction, wherein a distal end portion of the spool is inserted in the opening of the inner sleeve; and an outer sleeve that has an axial hole which extends in the axial direction, wherein the inner sleeve is inserted in at least a portion of the axial hole; and in a state where the spool is positioned farthest from the actuator, the distal end portion projects from the opening toward a side that is opposite to the actuator;

the hydraulic oil control valve further comprises a stopper that is configured to contact the spool and defines a limit of movement of the spool in a direction away from the actuator, wherein:

the stopper is placed at an outside of a slide range of the spool in the axial direction;

the spool has a base end portion that is formed at the one end of the spool and outwardly projects in the radial direction; and the stopper is formed at an end portion of the inner sleeve located on a side where the actuator is placed, wherein the stopper is configured to contact the base end portion.

9. The hydraulic oil control valve according to claim 8, wherein:

a supply port, which is communicated with the hydraulic oil supply source, is formed at the inner sleeve;

the spool includes:

at least a portion of a drain oil passage configured to conduct the hydraulic oil discharged from a phase shifter of the valve timing adjusting device; and a drain flow inlet that is configured to guide the hydraulic oil, which is discharged from the phase shifter, to the drain oil passage; and the drain flow inlet and the supply port are communicated with each other.

* * * * *